Sept. 8, 1959     A. G. SWEETLAND     2,903,283
TURNBUCKLES
Filed Nov. 19, 1956
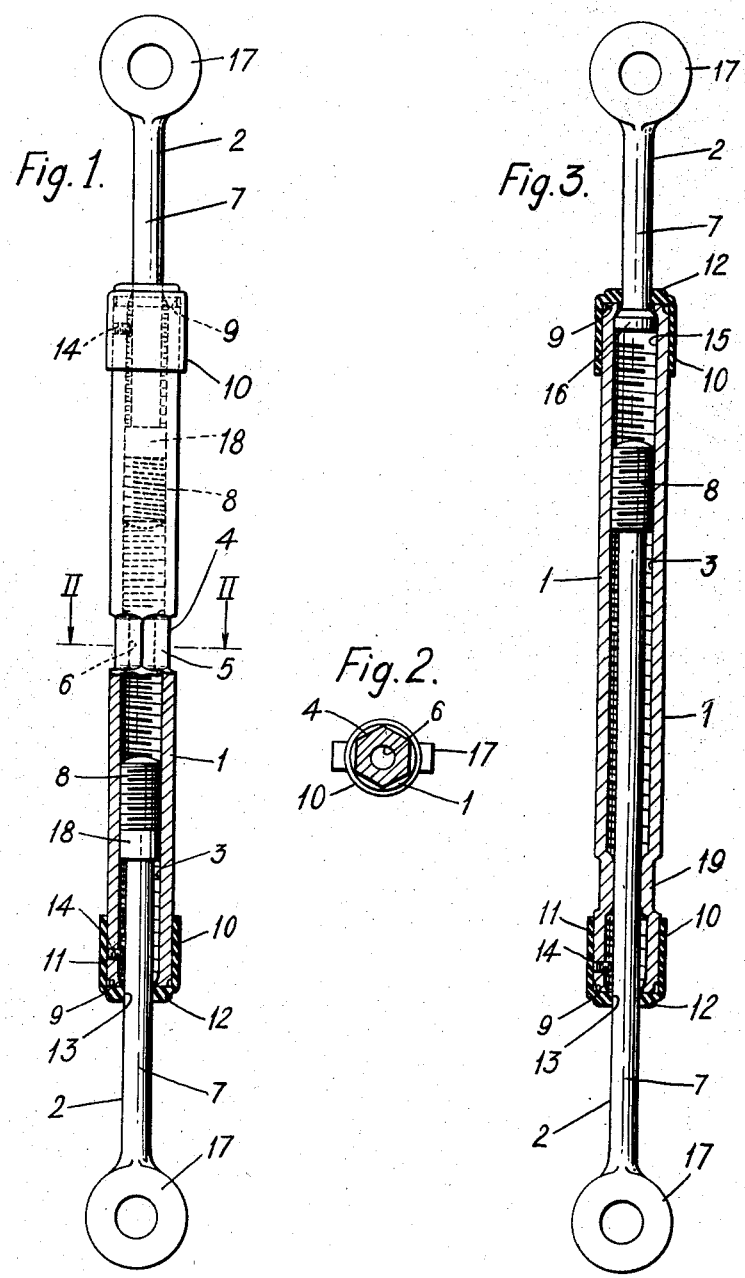
Inventor
A. G. Sweetland
By
Webb Mackey & Burden
Attorney United States Patent Office 2,903,283
Patented Sept. 8, 1959

2,903,283

TURNBUCKLES

Arthur George Sweetland, Childwall, Liverpool, England, assignor to British Insulated Callender's Cables Limited, London, England, a British company Application November 19, 1956, Serial No. 623,138

Claims priority, application Great Britain December 5, 1955

3 Claims. (Cl. 287—61)

This invention relates to turnbuckles by which term we mean devices each comprising a pair of end members and an intermediate member which serves to couple together the two end members and by its rotation in one direction relative to one or both of the end members serves to draw the end members towards one another and by its rotation in the reverse direction serves to separate them. Such devices involve a screw thread engagement between at least one of the end members and the intermediate member. The latter member is often an internally screw threaded sleeve, one or both of the end members being a bolt having an eye or clevis end.

The forms of turnbuckle now in use suffer from the disadvantage that a portion or portions of the threaded bolt or bolts are exposed and when the turnbuckle is used—as often it must be—in corrosive atmospheres the threads become corroded and mechanical failure may result. It is an object of this invention to provide an improved form of turnbuckle in which the risk of corrosion of the screw threads is eliminated or at least substantially reduced.

In accordance with our invention we provide a turnbuckle comprising an intermediate member in the form of a sleeve having an internally screw threaded part and a pair of end members coupled to the sleeve and rotatable with respect thereto, one of the end members comprising an externally screw threaded part that is short relative to the internally screw threaded part of the sleeve which it engages and a plain shank part of greater length than its screw threaded part and lying partly within the sleeve, the neighbouring end of which surrounds it with a small clearance.

Where both end members are in screw threaded engagement with the sleeve, one end member has a left hand screw threaded part and the other a right hand screw threaded part and the sleeve has two internally screw threaded parts, the threads in one part being left-handed and those in the other being right-handed, to suit the threaded parts of the two end members.

The invention will be described further with the aid of the accompanying drawings wherein:

Figure 1 is a longitudinal view partly in section,

Figure 2 is a section on the line II—II of Figure 1, and

Figure 3 is a longitudinal section of a modified form of construction.

In each of the constructions illustrated the turnbuckle comprises an intermediate member having the form of a metal sleeve 1 and two metal end members, indicated generally by the reference numerals 2, entering the ends of the sleeve 1. The outer surface of the sleeve is mainly cylindrical.

In Figure 1 the internal surface of the sleeve is provided with two separate sets of threads, those of one set being of right hand and those of the other set being of left hand. For convenience of description the parts of the sleeve 1 thus screw-threaded will be referred to hereinafter as the internally threaded parts 3 of the sleeve. The inner ends of these two parts are separated by a central portion 4 of the sleeve having a hexagonal outer surface 5 and an unthreaded cylindrical bore 6.

Each end member 2 has the form of an eye bolt (and will be referred to hereinafter as such) and consists of an eye 17, a cylindrical portion 7, an enlarged cylindrical head 18 and a screw threaded part 8 adjacent the head 18. For convenience of description the cylindrical portion 7 and the head 18 are referred to hereinafter as the shank of the eye bolt. The threads of the two parts 8 are of opposite hand and each threaded part engages the appropriate internally threaded part 3 of the sleeve 1. The hexagonal surface 5 of the central portion 4 provides means whereby the sleeve can be engaged by a spanner for the rotation of the sleeve relative to the two eye bolts 2 in order to cause movement of the latter towards or away from one another according to the direction of rotation of the sleeve 1. To provide for ample movement of the end members 2 relative to the sleeve 1 the length of each threaded part 8 is short as compared with the length of the internally threaded part 3 of the sleeve which it engages. In Figure 1 this length is shown as being somewhat less than a third of that of the internally threaded part 3. The two internally threaded parts of the sleeve 1 are made of the same length, this being about equal to the length of the shank.

The diameter of each cylindrical portion 7 is somewhat less than the root diameter of the internally threaded parts 3 of the sleeve so that there is between each threaded part and the adjacent shank an appreciable clearance. To prevent the possibility of the threaded parts 8 of the eye bolts being withdrawn beyond the ends of the sleeve 1, and the threads thereby exposed, and also to minimize the risk of atmospheric moisture or other corrosive atmosphere entering the sleeve, the extremities of the sleeve are compressed in order to reduce the clearance between the cylindrical portions 7 at those parts of the sleeve. To reduce the clearances between the ends of the sleeve 1 and the cylindrical portions 7 of the shanks, pressure with the aid of a suitable die is applied externally to the sleeve at its ends to force the ends of the sleeve inwards towards the cylindrical portions 7. This compression may be such as to give a hexagonal shape to the exterior surface of the sleeve 1. In Figures 1 and 3 the lines 9 indicate the compressed ends of the sleeve. It will be seen that the compressed areas extend inwards from the ends of the sleeve for very short distances. The external surface of the sleeve need not necessarily be compressed to a hexagonal shape of course, but the compression should be carried out so as to provide for a very small clearance between the sleeve and the adjacent shank. The hexagonal surface of the central portion 4 of the sleeve 1 may also be produced by externally applied compression, the resulting reduction in diameter of the sleeve having the effect of stops limiting the extent to which the eye bolts 2 can be caused to approach one another.

Where found necessary or desirable still further to minimize the risk of entry of moisture or other corrosive atmosphere to the interior of the sleeve 1, cap 10 adapted to seal the ends of the sleeve may be provided over the ends of the latter. The sealing caps are made of neoprene or other elastomeric material and comprise a cylindrical sleeve portion 11 and an end wall 12, the latter having a central hole 13 for the passage of the adjacent cylindrical portion 7. When the sealing caps 10 are placed over the ends of the sleeve 1 the cylindrical portions 11 are adapted to make a tight fit with the outer surface of the sleeve and the end walls 12 to make a running fit with the cylindrical portions 7 of the shanks of the eye bolts 2, the central holes 13 in the end walls being of a slightly smaller diameter than that of the adjacent cylindrical portion 7.

As a still further precaution against corrosion of the threaded parts of the turnbuckle the interior of the sleeve may be smeared with a suitable grease. The grease may be used in addition to the end caps 10 or as an alternative thereto.

When the turnbuckle is in use and the eye bolts 2 have been brought to their adjusted positions they may be locked in those positions by Allen screws 14 passing through holes near the ends of the sleeve 1 and being adapted to be screwed up into tight contact with the adjacent cylindrical portions 7. These Allen screws have no heads but are provided with hexagonal recesses for the reception of a suitable tightening tool. When the sealing caps 10 are used they will be drawn back over the cylindrical portions 7 and the required adjustment of the eye bolts 2 made and the latter then locked in position by the screws 14 and the sealing caps 10 could then be drawn back again over the ends of the sleeve 1 in order to bring the end walls 12 into tight contact with the end surfaces of the sleeve, in which position the caps 10 will seal the ends of the sleeve and also extend over the screws 14. The provision of the heads 18 prevents outward movement of the shanks to such an extent that the screws 14 could be brought into engagement with the threads of the screw threaded parts 8.

The construction illustrated in Figure 3 is very similar in general to that shown in Figure 1 but in Figure 3, instead of there being two internally threaded parts 3 there is only one such part. This threaded part extends from one end of the sleeve 1 almost to the opposite end, but at the opposite end there is an unthreaded portion 15 of quite short length. This portion receives an enlarged head 16 provided at the inner end of the adjacent cylindrical portion 7. The ends of the sleeve 1 are treated in the same manner as already described with reference to Figure 1 and sealing caps 10 fitted over the ends of the sleeve. The provision of the head 16 prevents its eye bolt 2 from being withdrawn from the sleeve 1. In Figure 3 the threaded part 3 has approximately the same length as the total length of the two corresponding parts shown in Figure 1 and the increased length of the threaded part of the sleeve 1 of Figure 3 provides for a longitudinal movement of the eye bolt substantially equal to the combined movements of the two eye bolts of Figure 1. The length of the threaded part 8 of the eye bolt is shown as being about one-seventh of the length of the threaded part 3 of the sleeve 1. The threaded part 3 of the sleeve may extend from one end to a point about ¾" from the end of the sleeve. In Figure 3 the sleeve 1 is shown with a portion 19. This is similar to the portion 4 of Figure 1, but instead of being centrally of the sleeve 1, it is placed near that end at which the Allen screw 14 is provided but is further away from the end of the sleeve 1 than is the Allen screw 14. The screw threaded part 8 does not require to have an enlarged head adjacent it as in Figure 1, since the constriction of the sleeve 1 resulting from compression of the portion 19 will prevent withdrawal of the eye bolt to such an extent as to enable the screw 14 to engage the threads of the screw threaded part 8. The construction shown in Figure 3 has the advantage that locking means for one of the eye bolts only is required.

It will be seen that the invention provides for a substantially complete enclosure for the threaded part or parts of the sleeve and of the eye bolt or bolts, so that the risk of the threaded parts becoming damaged by use of the turnbuckle in atmospheres which would normally result in corrosion of the threaded parts is eliminated or at least very substantially reduced.

What I claim as my invention is:

1. A turnbuckle comprising a sleeve having an internally screw threaded part extending from near one end of the sleeve to a point adjacent the opposite end of the sleeve, and a pair of end members one of which comprises an externally screw threaded part engaging the internally screw threaded part of the sleeve and of short length relative to that internally screw threaded part of the sleeve, and a plain shank part of greater length than its screw threaded part lying partly within the sleeve, the neighbouring end of which sleeve surrounds the shank part with a small clearance, a screw adjacent that end of the sleeve for engaging the shank part to lock the end member after adjustment and that end of the sleeve having at a place more remote from the end than the locking screw an internally restricted bore to prevent the locking screw engaging the externally threaded part of the end member when the latter is in its outermost position, the external surface of the sleeve at the place where the bore is restricted being shaped for engagement by a spanner, the other end member also comprising a plain shank part lying partly within the sleeve where it has an enlarged portion preventing withdrawal of that end member from the sleeve, the neighbouring end of which latter surrounds the shank part of that end member with a small clearance.

2. In a turnbuckle comprising a sleeve having adjacent at least one end thereof a screw-threaded aperture and screw-threaded locking means therein and at least one internally screw-threaded part, and a pair of end members coupled to the sleeve and rotatable with respect thereto, at least one of the end members comprising an externally screw-threaded part engaging an internally screw-threaded part of the sleeve, each end member also comprising a plain shank part, the turnbuckle also having means for preventing the complete withdrawal of the end members through the ends of the sleeve, the improvement comprising a non-threaded flexible cup-shaped end cap of elastomeric material at each end of the sleeve and having an apertured end wall of substantial thickness closely surrounding the neighbouring part of a shank part of an end member and having a cylindrical part making a push-on force fit with the neighbouring end part of the sleeve, at least one of the end caps extending over a neighbouring screw-threaded aperture and the screw-threaded locking means therein, sealing the aperture and each end cap co-operating with the neighbouring part of the shank of an end member to seal the sleeve at its ends.

3. In a turnbuckle comprising a sleeve having adjacent at least one end thereof a screw-threaded aperture and screw-threaded locking means therein and at least one internally screw-threaded part, and a pair of end members coupled to the sleeve and rotatable with respect thereto, at least one of the end members comprising an externally screw-threaded part engaging an internally threaded part of the sleeve, each end member also comprising a plain shank part, the turnbuckle also having means for preventing the complete withdrawal of the end members through the ends of the sleeve, the improvement comprising at least one of the end members having a plain head and the sleeve adjacent one end thereof having a constricted portion of smaller size than the head, the head and the constricted portion being so relatively disposed to one another and to an adjacent screw-threaded locking means that the latter cannot be brought into engagement with the externally threaded portion of the end member, a flexible cup-shaped non-threaded end cap of elastomeric material at each end of the sleeve having an apertured end wall of substantial thickness closely surrounding the neighbouring part of a shank of an end member and also having a cylindrical part making a push-on force fit with the neighbouring end part of the sleeve, at least one of the end caps extending over a neighbouring screw-threaded aperture and the screw-threaded locking means therein, sealing the aperture against the penetration of corrosive atmospheres into the interior of the turnbuckle and each end cap co-operating with the neighbouring part of the shank of an end member to seal the sleeve at its ends.

References Cited in the file of this patent

UNITED STATES PATENTS

| | | |
|---|---|---|
| 645,810 | Hennessy | Mar. 20, 1900 |
| 1,002,001 | Short | Aug. 29, 1911 |
| 1,003,355 | Green | Sept. 12, 1911 |
| 1,016,835 | Levy-Maurice et al. | Feb. 6, 1912 |
| 1,313,450 | Beals | Aug. 19, 1919 |
| 2,363,050 | Dewey | Nov. 21, 1944 |
| 2,678,226 | Wright | May 11, 1954 |
| 2,701,733 | Frevik et al. | Feb. 8, 1955 |
| 2,706,124 | Koch | Apr. 12, 1955 |
| 2,850,305 | Chadowski et al. | Sept. 2, 1958 |